US009821461B1

(12) United States Patent
Urata et al.

(10) Patent No.: US 9,821,461 B1
(45) Date of Patent: Nov. 21, 2017

(54) DETERMINING A TRAJECTORY FOR A WALKING ROBOT TO PREVENT MOTOR OVERHEATING (71) Applicant: X Development LLC, Mountain View, CA (US)

(72) Inventors: Junichi Urata, Tokyo (JP); Yoshito Ito, Tokyo (JP)

(73) Assignee: X Development LLC, Mountain View, CA (US)

( * ) Notice: Subject to any disclaimer, the term of this patent is extended or adjusted under 35 U.S.C. 154(b) by 31 days.

(21) Appl. No.: 14/879,794

(22) Filed: Oct. 9, 2015

(51) Int. Cl.
*B25J 9/16* (2006.01)
*B25J 5/00* (2006.01)

(52) U.S. Cl.
CPC ............... *B25J 9/1674* (2013.01); *B25J 5/00* (2013.01); *B25J 9/1664* (2013.01); *Y10S 901/01* (2013.01)

(58) Field of Classification Search
None
See application file for complete search history.

(56) References Cited

U.S. PATENT DOCUMENTS

| 6,438,454 | B1 | | 8/2002 | Kuroki | |
|---|---|---|---|---|---|
| 7,348,746 | B2 | | 3/2008 | Ogawa et al. | |
| 8,473,102 | B2 | | 6/2013 | Andoh | |
| 9,205,560 | B1 | * | 12/2015 | Edsinger | B25J 9/1674 |
| 9,381,961 | B1 | * | 7/2016 | Kataoka | B62D 57/02 |
| 9,475,191 | B1 | * | 10/2016 | Urata | B62D 57/022 |
| 2005/0179416 | A1 | * | 8/2005 | Iribe | B25J 9/1674 |
| | | | | | 318/563 |
| 2008/0040040 | A1 | * | 2/2008 | Goto | G05D 1/024 |
| | | | | | 701/301 |
| 2009/0076653 | A1 | | 3/2009 | Hietmann et al. | |
| 2010/0060225 | A1 | * | 3/2010 | Kosaka | B60L 15/2036 |
| | | | | | 318/566 |
| 2012/0245734 | A1 | * | 9/2012 | Yun | B62D 57/032 |
| | | | | | 700/253 |
| 2015/0306768 | A1 | * | 10/2015 | Liang | G06F 17/5009 |
| | | | | | 703/2 |
| 2016/0008976 | A1 | * | 1/2016 | Nagatsuka | B25J 9/163 |
| | | | | | 700/253 |
| 2016/0082591 | A1 | * | 3/2016 | Takagi | B25J 9/1674 |
| | | | | | 700/256 |

OTHER PUBLICATIONS

Johnson, Aaron M. et al., "Self-Manipulation and Dynamic Transitions for a Legged Robot," University of Pennsylvania, 2014.

* cited by examiner

*Primary Examiner* — Ryan Rink
(74) *Attorney, Agent, or Firm* — McDonnell Boehnen Hulbert & Berghoff LLP (57) ABSTRACT

An example method includes determining one or more first movements that begin with a robot at a first position, determining one or more second movements that begin with the robot at the first position and end with the robot standing at a second position, making a first prediction of whether one or more motors of the robot executing the one or more first movements would cause a future temperature of any of the one or more motors to exceed a threshold temperature, making a second prediction of whether the one or more motors executing the one or more second movements would cause a future temperature of any of the one or more motors to exceed the threshold temperature, and causing the one or more motors to execute either (i) the one or more first movements or (ii) the one or more second movements.

20 Claims, 9 Drawing Sheets

DETERMINING A TRAJECTORY FOR A WALKING ROBOT TO PREVENT MOTOR OVERHEATING

BACKGROUND

Various types of robots may perform a variety of functions that may assist users. Robots may be used for applications involving material handling, transportation, welding, assembly, and dispensing, among others. Over time, the manner in which these robots operate is becoming more intelligent, efficient, and intuitive. As robots become increasingly prevalent in numerous aspects of modern life, the desire for efficient robots becomes apparent. Therefore, a demand for efficient robots has helped open up a field of innovation in actuators, movement, sensing techniques, as well as component design and assembly.

SUMMARY

The present disclosure generally relates to a walking robot determining a "safe" trajectory for the robot to execute, if necessary, to prevent overheating of one or more of its motors. For example, the robot may include at least two legs, with each of the legs including one or more motors configured to cause the robot to walk by moving the legs upon a walking surface. In some cases, executing a walking trajectory at high speeds or for long periods of time may cause at least one of the robot's motors to overheat. This may be alleviated by the robot determining (perhaps continuously) a safe trajectory based on the robot's current state of movement and/or current temperatures of the motors. In some examples, the safe trajectory may be a trajectory that is suitable for quickly transitioning the robot from moving at a high velocity (e.g., running) to a standing stationary position. For example, the robot may evaluate several possible safe trajectories, predict future motor temperatures that may occur by executing such trajectories, and select a safe trajectory that, when executed by the robot, allows the robot to achieve a standing stationary position before overheating of any of its motors occurs. Once the robot is standing in a stationary position, the heat generated by the one or more motors is reduced and the motors are allowed to cool, thus preventing overheating of the motors, or at least preventing overheating of the motors before the robot reaches the standing stationary position.

In one example, a robot includes one or more processors, one or more motors, and a computer-readable storage medium storing instructions that, when executed by the one or more processors, cause the one or more processors to perform functions. The functions include determining one or more first movements of a walking trajectory that begins with the robot at a first position. The functions further include determining one or more second movements of a safe trajectory that begins with the robot at the first position and ends with the robot standing at a second position. The functions further include making a first prediction of whether the one or more motors executing the one or more first movements would cause a future temperature of any of the one or more motors to exceed a threshold temperature. The functions further include making a second prediction of whether the one or more motors executing the one or more second movements would cause a future temperature of any of the one or more motors to exceed the threshold temperature. The functions further include, based on the first prediction and the second prediction, causing the one or more motors to execute either (i) the one or more first movements or (ii) the one or more second movements.

In another example, a non-transitory computer-readable medium stores instructions that, when executed by one or more processors of a robot, cause the one or more processors to perform functions. The functions include determining one or more first movements of a walking trajectory that begins with the robot at a first position. The functions further include determining one or more second movements of a safe trajectory that begins with the robot at the first position and ends with the robot standing at a second position. The functions further include making a first prediction of whether the one or more motors executing the one or more first movements would cause a future temperature of any of the one or more motors to exceed a threshold temperature. The functions further include making a second prediction of whether the one or more motors executing the one or more second movements would cause a future temperature of any of the one or more motors to exceed the threshold temperature. The functions further include, based on the first prediction and the second prediction, causing the one or more motors to execute either (i) the one or more first movements or (ii) the one or more second movements.

In yet another example, a method includes determining one or more first movements of a walking trajectory that begins with a robot at a first position. The method further includes determining one or more second movements of a safe trajectory that begins with the robot at the first position and ends with the robot standing at a second position. The method further includes making a first prediction of whether one or more motors of the robot executing the one or more first movements would cause a future temperature of any of the one or more motors to exceed a threshold temperature. The method further includes making a second prediction of whether the one or more motors executing the one or more second movements would cause a future temperature of any of the one or more motors to exceed the threshold temperature. The method further includes, based on the first prediction and the second prediction, causing the one or more motors to execute either (i) the one or more first movements or (ii) the one or more second movements.

These as well as other aspects, advantages, and alternatives, will become apparent to those of ordinary skill in the art by reading the following detailed description, with reference where appropriate to the accompanying figures.

DETAILED DESCRIPTION

Example implementations are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

A legged robot such as a biped robot or a quadruped robot may be configured to execute various movements using one or more motors. For example, a biped robot may include (i) one or more first motors configured to cause movement of a first leg of the robot, and (ii) one or more second motors configured to cause movement of a second leg of the robot. A quadruped robot may similarly include four sets of one or more motors that cause respective movement of four legs of the quadruped robot.

The legged robot may walk along a walking trajectory by using its legs to execute a sequence of strides of predetermined lengths and directions at respective predetermined times. For example, the walking trajectory may include a sequence of strides for the robot to execute over a course of a few minutes. In some instances, the robot executing the walking trajectory at a high rate of speed and/or for a long period of time may cause at least one of the robot's motors to overheat.

If the robot determines that continuing to execute the walking trajectory would cause a motor of the robot to overheat, the robot may discontinue the walking trajectory and execute a "safe" trajectory to transition the robot to a standing stationary position for cooling. In some instances, the robot may also be controlled to discontinue the walking trajectory and execute the safe trajectory in response to determining that executing the safe trajectory would cause a motor of the robot to overheat. This helps ensure that the robot does not find itself in a state where the robot is unable to transition to a standing stationary position before overheating occurs. In the standing stationary position, input current provided to motors of the robot may be minimized. This may reduce the amount of heat that the motors generate, thereby avoiding or mitigating overheating of the motors.

However, when the robot is moving at a high rate of speed, transitioning to the standing stationary position may be a non-trivial exercise. For instance, it might not be physically possible for the robot to transition to the standing stationary position by immediately planting its first leg on the ground and then planting its second leg on the ground; the robot may need to execute a series of strides that decelerate the robot before attempting to rest both legs on the ground.

Accordingly, as the robot is executing the walking trajectory, the robot may periodically or continuously determine a safe trajectory, perhaps while monitoring the temperatures of its motors, to avoid a scenario in which the robot cannot reach a standing stationary position before overheating one of its motors. For example, the robot may determine one or more first movements of a walking trajectory that begins with the robot at a first position. The robot may also determine one or more second movements of a safe trajectory that begins at the first position and ends with the robot standing at a second position. The robot may then make a first prediction of whether executing the one or more first movements of the walking trajectory would cause a future temperature of any motor of the robot to exceed a threshold temperature. Also, the robot may make a second prediction of whether executing the one or more second movements of the safe trajectory would cause the future temperature of any motor of the robot to exceed the threshold temperature. Based on the results of the first and/or second predictions, the robot may execute either (i) the one or more first movements of the walking trajectory or (ii) the one or more second movements of the safe trajectory.

For example, if the robot predicts (i) that executing the one or more first movements of the walking trajectory would not cause any of its motors to overheat and (ii) that executing the one or more second movements of the safe trajectory would also not cause any of its motors to overheat, the robot may execute the one or more first movements of the walking trajectory. Also, if the robot predicts that executing the one or more first movements of the walking trajectory would cause any of its motors to overheat, the robot may execute the one or more second movements of the safe trajectory. Finally, if the robot predicts that executing the one or more second movements of the safe trajectory would cause any of its motors to overheat, the robot may execute the one or more second movements of the safe trajectory.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Figure 1:
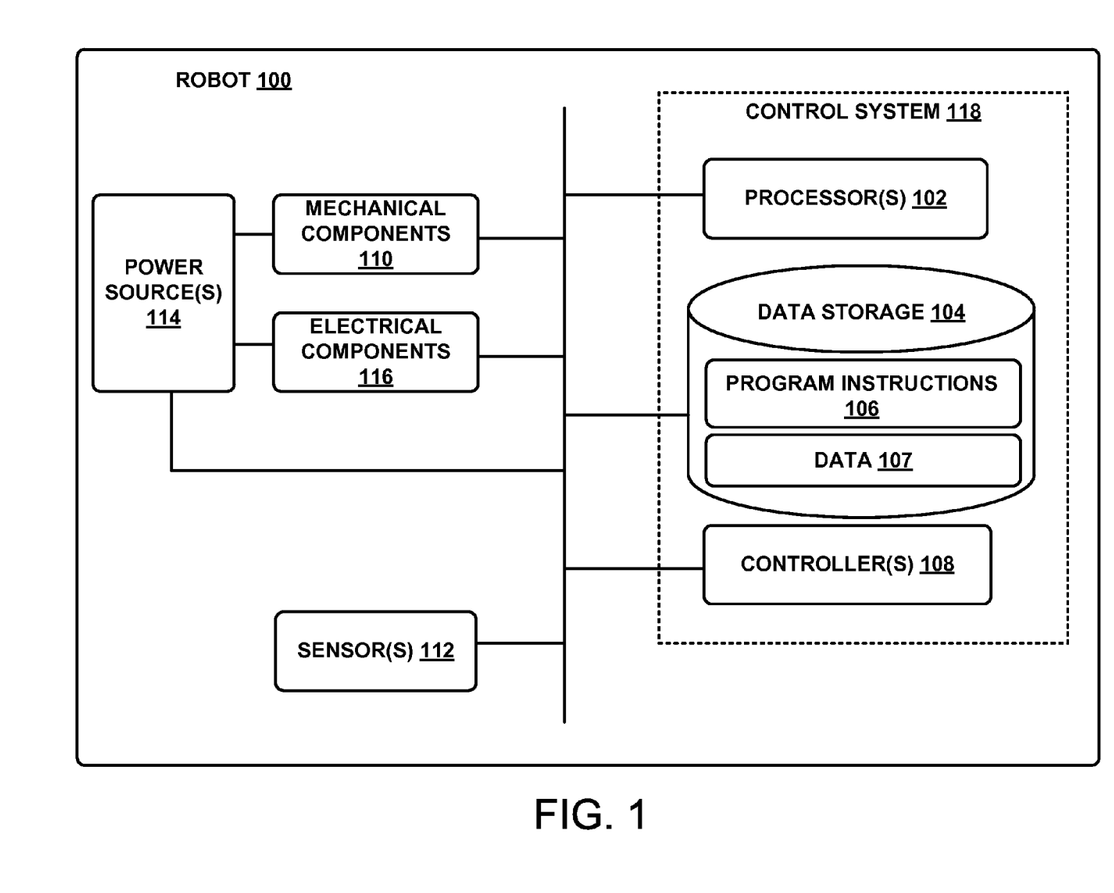
FIG. 1 illustrates a configuration of a robot, according to an example implementation.

FIG. 1 illustrates an example configuration of a robot that may be used in connection with the implementations described herein. The robot 100 may be configured to operate autonomously, semi-autonomously, and/or in response to commands provided by a user. The robot 100 may be implemented in various forms, such as a biped robot, a quadruped robot, or some other arrangement. Furthermore, the robot 100 may also be referred to as a robotic system, a robotic device, or a mobile robot, among other designations.

As shown in FIG. 1, the robot 100 may include processor(s) 102, data storage 104, and controller(s) 108, which together may be part of a control system 118. The robot 100 may also include sensor(s) 112, power source(s) 114, mechanical components 110, and electrical components 116. Nonetheless, the robot 100 is shown for illustrative purposes, and may include more or fewer components. The various components of robot 100 may be connected in any manner, including wired or wireless connections. Further, in some examples, components of the robot 100 may be distributed among multiple physical entities rather than a single physical entity. Other example illustrations of robot 100 may exist as well.

Processor(s) 102 may operate as one or more general-purpose hardware processors or one or more special-purpose hardware processors (e.g., digital signal processors, application specific integrated circuits, etc.). The processor(s) 102 may be configured to execute computer-readable program instructions 106, and manipulate or process data 107, both of which are stored in the data storage 104. The processor(s) 102 may also directly or indirectly interact with other components of the robot 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller(s) 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robot 100. In some implementations, the controller(s) 108 may be a purpose-built embedded device for performing specific operations with one or more subsystems of the robot 100.

The control system 118 may monitor and physically change the operating conditions of the robot 100. In doing so, the control system 118 may serve as a link between portions of the robot 100, such as between mechanical components 110 and/or electrical components 116. In some instances, the control system 118 may serve as an interface between the robot 100 and another computing device. Further, the control system 118 may serve as an interface between the robot 100 and a user. For instance, the control system 118 may include various components for communicating with the robot 100, including a joystick, buttons, and/or ports, etc. The example interfaces and communications noted above may be implemented via a wired or wireless connection, or both. The control system 118 may perform other operations for the robot 100 as well.

During operation, the control system 118 may communicate with other systems of the robot 100 via wired or wireless connections, and may further be configured to communicate with one or more users of the robot 100. As one possible illustration, the control system 118 may receive an input (e.g., from a user or from another robot) indicating an instruction to execute a particular trajectory (e.g., gait) in a particular direction, and at a particular speed. A trajectory may include a series of movements of the limbs of the robot 100, for example.

Based on this input, the control system 118 may perform operations to cause the robot 100 to move according to the requested trajectory. As another illustration, the control system 118 may receive an input indicating an instruction to move to a particular geographical location. In response, the control system 118 (perhaps with the assistance of other components or systems) may determine a direction, speed, and/or trajectory based on the environment through which the robot 100 may move to the geographical location.

Operations of the control system 118 may be carried out by the processor(s) 102. Alternatively, these operations may be carried out by the controller(s) 108, or a combination of the processor(s) 102 and the controller(s) 108. In some implementations, the control system 118 may partially or wholly reside on a device other than the robot 100, and therefore may at least, in part, control the robot 100 remotely.

Mechanical components 110 represent hardware of the robot 100 that may enable the robot 100 to perform physical operations. As a few examples, the mechanical components 110 may include physical members such as leg(s), arm(s), and/or wheel(s). The physical members or other parts of mechanical components 110 may further include actuators and/or motors arranged to move the physical members in relation to one another. The robot 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robot 100 may be configured to attach and/or remove such removable components, which may involve assistance from a user and/or another robot. For example, the robot 100 may be configured with removable arms, hands, feet, and/or legs, so that these appendages can be replaced or changed as needed or desired. In some implementations, the robot 100 may include one or more removable and/or replaceable battery units or sensors. Other types of removable components may be included within some implementations.

The robot 100 may include sensor(s) 112 arranged to sense aspects of the robot 100 or its surroundings. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robot 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robot 100 with its environment, as well as monitoring of the operation of the robot 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robot 100 is operating. The sensor(s) 112 may monitor the environment in real time, and detect obstacles, elements of the terrain, weather conditions, temperature, and/or other aspects of the environment.

Further, the robot 100 may include sensor(s) 112 configured to receive information indicative of the state of the robot 100, including sensor(s) 112 that may monitor the state of the various components of the robot 100. The sensor(s) 112 may measure activity of systems of the robot 100 and receive information based on the operation of the various features of the robot 100, such the operation of legs, arms, or other mechanical and/or electrical features of the robot 100. The data provided by the sensor(s) 112 may enable the control system 118 to determine errors in operation as well as monitor overall operation of components of the robot 100.

As an example, the robot 100 may use force sensors to measure load on various components of the robot 100. In some implementations, the robot 100 may include one or more force sensors on an arm or a leg to measure the load on the actuators or motors that move one or more members of the arm or leg. As another example, the robot 100 may use one or more position sensors to sense the position of the actuators or motors of the robot. For instance, such position sensors may sense states of extension, retraction, or rotation of the actuators or motors on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robot 100 based on the location of the IMU in the robot 100 and the kinematics of the robot 100.

The robot 100 may include other types of sensors not explicitly discussed herein. Additionally or alternatively, the robot may use particular sensors for purposes not enumerated herein.

The robot 100 may also include one or more power source(s) 114 configured to supply power to various components of the robot 100. Among other possible power systems, the robot 100 may include a hydraulic system, electrical system, batteries, and/or other types of power systems. As an example illustration, the robot 100 may include one or more batteries configured to provide electric current to components of the robot 100. Some of the mechanical components 110 and/or electrical components 116 may each connect to a different power source, may be powered by the same power source, or be powered by multiple power sources.

Any type of power source may be used to power the robot 100, such as electrical power or a gasoline engine. Additionally or alternatively, the robot 100 may include a hydraulic system configured to provide power to the mechanical components 110 using fluid power. Components of the robot 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robot 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robot 100. The electrical components 116 may interwork with the mechanical components 110 to enable the robot 100 to perform various operations. The electrical components 116 may be configured to provide power from the power source(s) 114 to the various mechanical components 110, for example. Further, the robot 100 may include electric motors. Other examples of electrical components 116 may exist as well.

Although not shown in FIG. 1, the robot 100 may include a body, which may connect to or house appendages and components of the robot. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robot 100, such as on the body and/or on one or more of the appendages, among other examples.

On its body, the robot 100 may carry a load, such as a type of cargo that is to be transported. The load may also represent external batteries or other types of power sources (e.g., solar panels) that the robot 100 may utilize. Carrying a load represents one example use for which the robot 100 may be configured, but the robot 100 may be configured to perform other operations as well.

As noted above, the robot 100 may include various types of legs, arms, wheels, and so on. In general, the robot 100 may be configured with zero or more legs. An implementation of the robot with zero legs may include wheels, treads, or some other form of locomotion. An implementation of the robot with two legs may be referred to as a biped, and an implementation with four legs may be referred as a quadruped. Implementations with six or eight legs are also possible. For purposes of illustration, biped and quadruped implementations of the robot 100 are described below.

Figure 2:
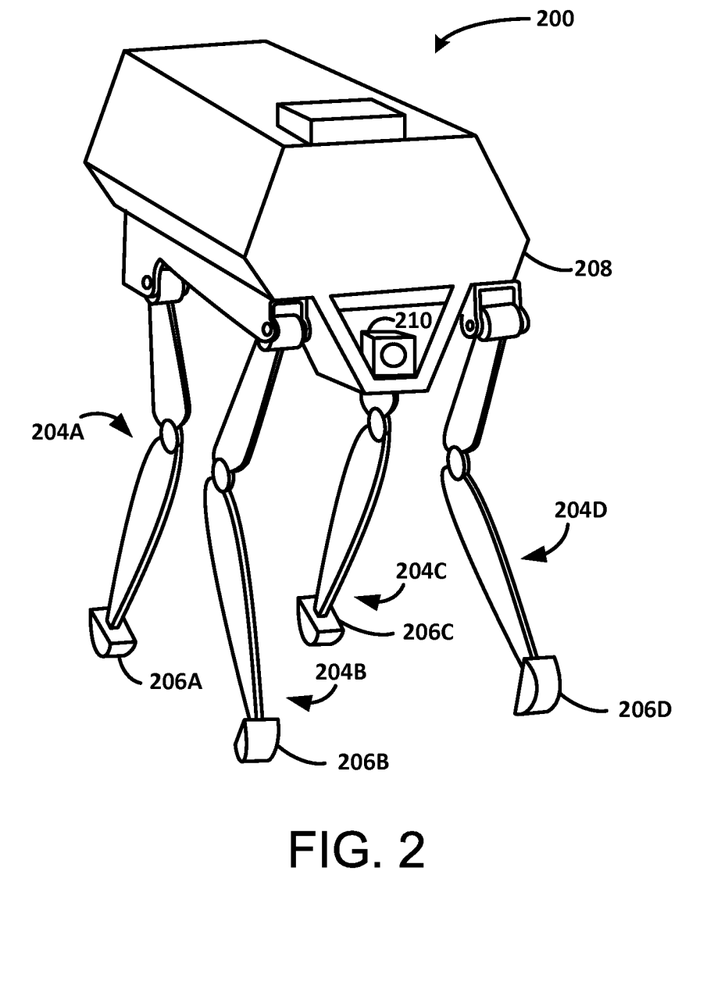
FIG. 2 illustrates a quadruped robot, according to an example implementation.

FIG. 2 illustrates a quadruped robot 200, according to an example implementation. Among other possible features, the robot 200 may be configured to perform some of the operations described herein. The robot 200 includes a control system (e.g., control system 118), and legs 204A, 204B, 204C, 204D connected to a body 208. Each leg may include a respective feet 206A, 206B, 206C, and 206D that may contact a walking surface (e.g., a ground surface). Further, the robot 200 is illustrated with sensor(s) 210, and may be capable of carrying a load on its body 208. Within other examples, the robot 200 may include more or fewer components, and thus may include components not shown in FIG. 2.

The robot 200 may be a physical representation of the robot 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A, 204B, 204C, and 204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different trajectories. The robot 200 may use one or more trajectories to travel within an environment, which may involve selecting a trajectory based on speed, terrain, the need to maneuver, and/or energy efficiency.

Further, different types of robots may use different trajectories due to variations in design. Although some trajectories may have specific names (e.g., walk, trot, run, bound, gallop, etc.), the distinctions between trajectories may overlap. The trajectories may be classified based on footfall patterns—the locations on a walking surface for the placement the feet 206A-206D. Similarly, trajectories may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
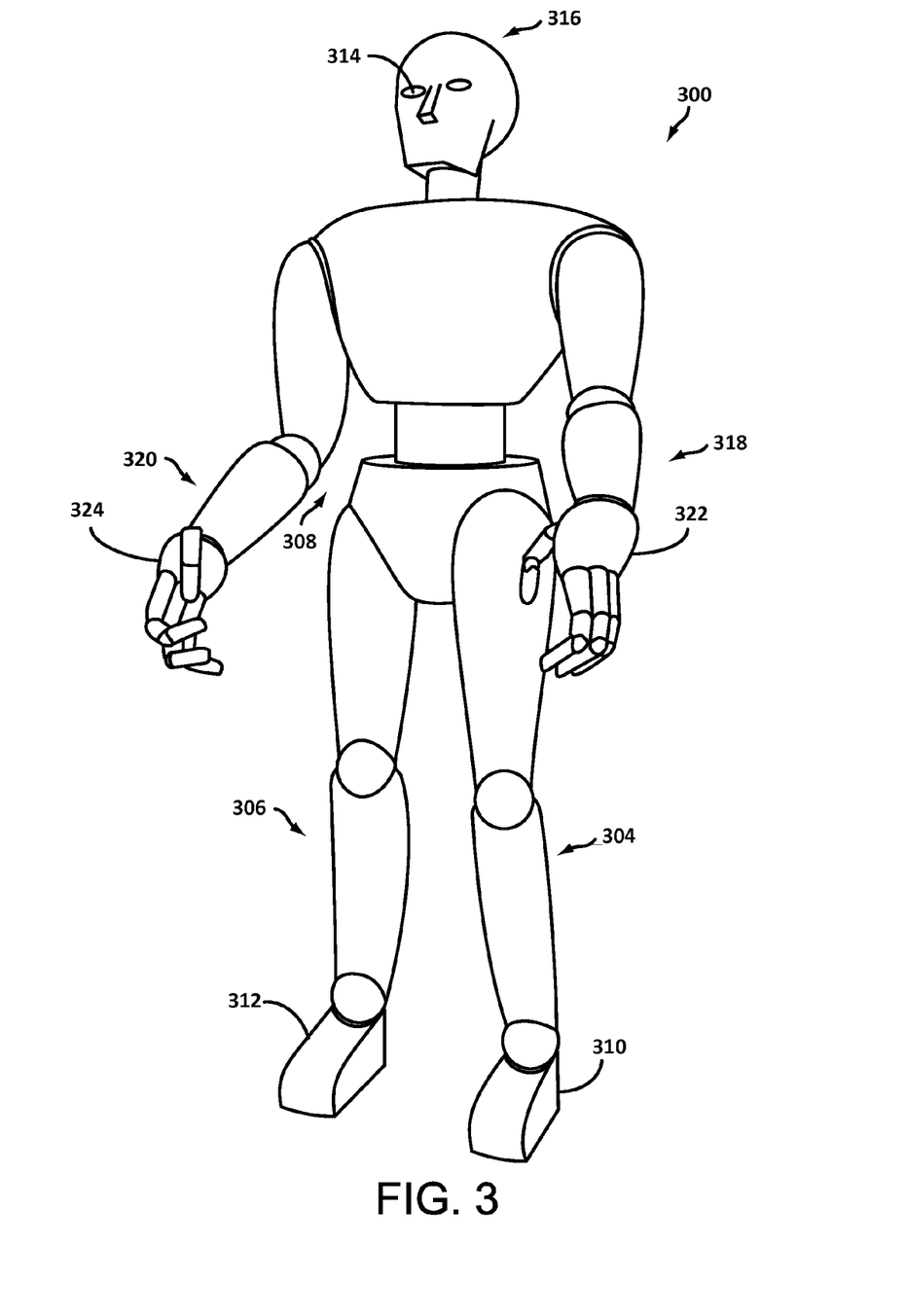
FIG. 3 illustrates a biped robot, according to an example implementation.

FIG. 3 illustrates a biped robot 300 according to another example implementation. Similar to robot 200, the robot 300 may correspond to the robot 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a walking surface (e.g., the ground surface). Like the robot 200, the legs 304 and 306 may enable the robot 300 to travel at various speeds according to the mechanics set forth within trajectories. The robot 300, however, may utilize different trajectories from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and be configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

Figure 4:
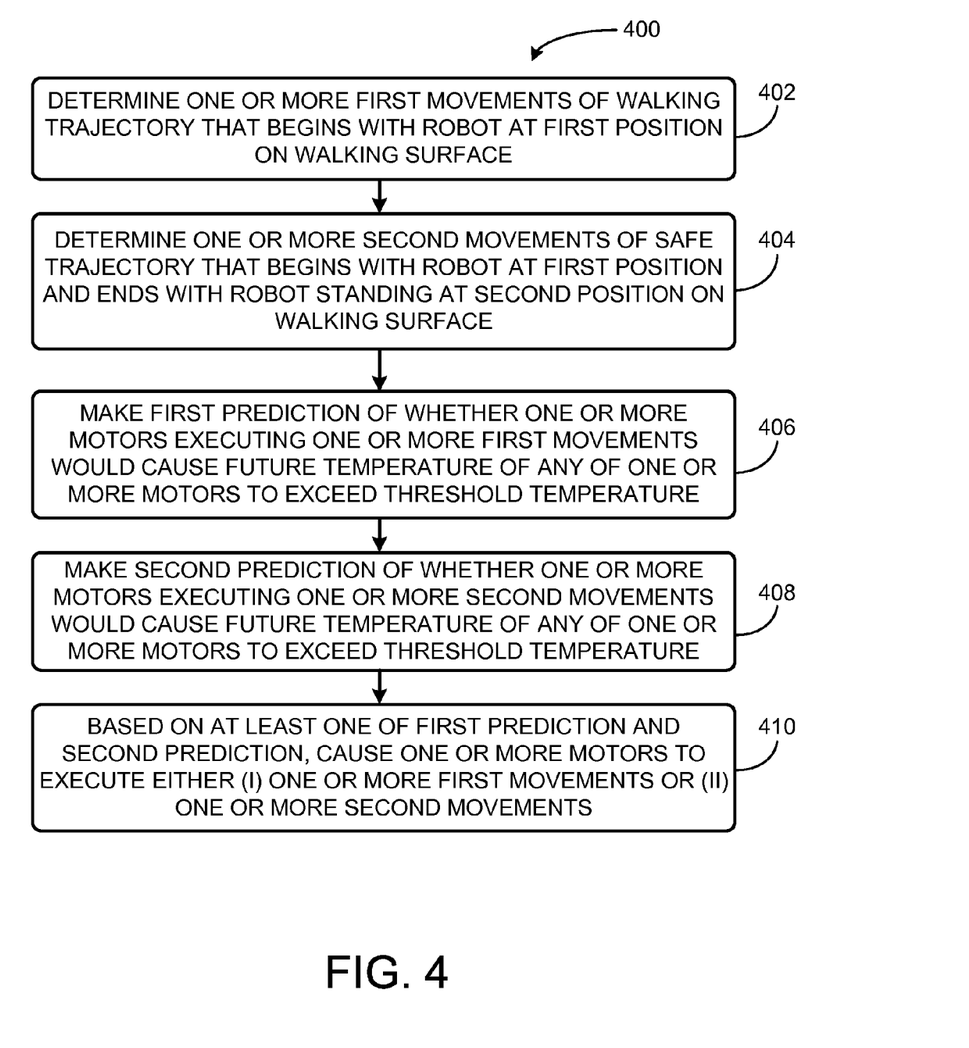
FIG. 4 is a block diagram of an example method.

Method 400 shown in FIG. 4 presents an example method that can be performed by one or more of (i) the robot 100 of FIG. 1, (ii) the robot 200 of FIG. 2, and (iii) the robot 300 of FIG. 3. The operations may be performed by any combination of one or more suitable components described herein. FIG. 4 may include one or more operations, functions, or actions as illustrated by one or more of blocks 402, 404, 406, 408, and 410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

Figure 5A:
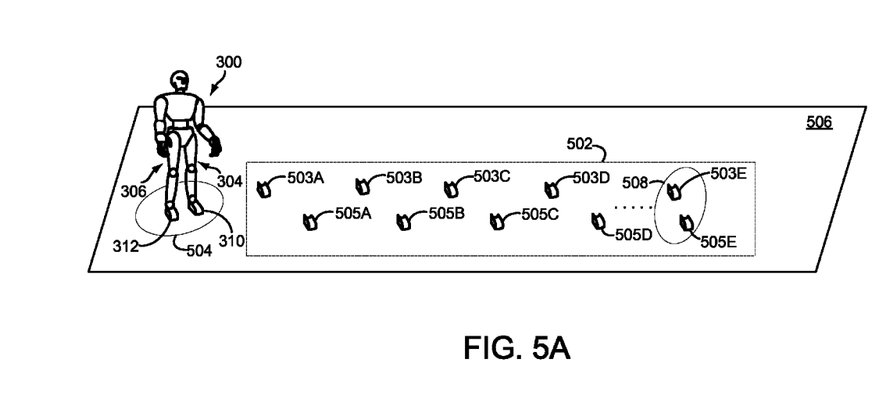
FIG. 5A depicts an example walking trajectory for a robot.

At block 402, the method 400 includes determining one or more first movements of a walking trajectory that begins with a robot at a first position. Referring to FIG. 5A, for example, the robot 300 may determine one or more first movements of a walking trajectory 502. As shown, the walking trajectory 502 begins at a position 504 on the walking surface 506 and ends at a position 508 on the walking surface 506. (Illustrative examples of the method 400 herein may include the robot 300, but the robot 200 or any other robot with legs could also perform the method 400.)

The walking trajectory 502 may be defined by one or more movements that the robot 300 may potentially execute. For instance, one or more motors of the robot 300 may move the leg 304 so that the foot 310 impacts the walking surface 506 at stride positions 503A, 503B, 503C, 503D, and 503E. Similarly, one or more motors of the robot 300 may move the leg 306 so that the foot 312 impacts the walking surface 506 at stride positions 505A, 505B, 505C, 505D, and 505E. More specifically, the one or more motors of the robot 300 may cause the leg 306 to push off from the position 504, causing the leg 304 to stride and place the foot 310 at the stride position 503A. Next, the one or more motors may cause the leg 304 to push off from the stride position 503A, allowing the leg 306 to stride and place the foot 312 at the stride position 505A. In a similar fashion, the one or motors may sequentially cause the foot 310 to land at the stride position 503B, the foot 312 to land at the stride position 505B, the foot 310 to land at the stride position 503C, the foot 312 to land at the stride position 505C, the foot 310 to land at the stride position 503D, the foot 312 to land at the stride position 505D, the foot 310 to land at the stride position 503E, and the foot 312 to land at the stride position 505E. In some examples, the walking trajectory 502 may include other stride positions for placement of the feet 310 and 312. For instance, the walking trajectory 502 may include one or more pairs of stride positions between the pair of stride positions 503D and 505D and the pair of stride positions 503E and 505E.

In some examples, the position 508 (i.e., a position of the robot 300 when the feet 310 and 312 rest respectively at stride positions 503E and 505E) may be a "destination" position for the robot 300. That is, the robot 300 may execute the walking trajectory 502 to walk to the position 508 to complete a task such as moving an object (not shown) located at the position 508, capturing audio and/or video at the position 508, assisting another robot (not shown) in completing a task, or carrying an object to the position 508. In some examples, the robot 300 may execute the walking trajectory 502 based on the robot 300 detecting various conditions within its environment. For instance, the robot 300 may use a radio transceiver to detect a radio beacon transmitting from the position 508, indicating that a user at the position 508 may be in need of cargo that the robot 300 is carrying. In other examples, the robot 300 may simply detect a verbal command spoken by such a user, and move to the position 508 in response to detecting the verbal command.

In other examples, the method 400 may further include receiving a command for the robot to move to the position 508. For example, a user may use a wireless controller, a wired controller, or another type of user interface to transmit such a command to the robot 300 to be received by the transceiver or the control system 118, for example. In this context, the robot 300 may determine the one or more first movements of the walking trajectory 502 such that the walking trajectory ends at the position 508.

Regardless of how the robot 300 determines the position 508 as a destination for the walking trajectory 502, the robot 300 may determine the stride positions 503A-E and 505A-E such that the stride positions 503A-E and 505A-E lead to the position 508. In some examples, the number of strides of the walking trajectory 502 may be minimized (e.g., based on the capabilities of the one or more motors and/or lengths of the legs 304 and 306) so as to minimize the time required to execute the walking trajectory 502 and reach the position 508. In other examples, the robot 300 determines the stride positions 503A-E and 505A-E so as to minimize the amount of energy expended by the robot 300 in moving to the position 508. Other ways of determining the stride positions 503A-E and 505A-E are possible.

Figure 5B:
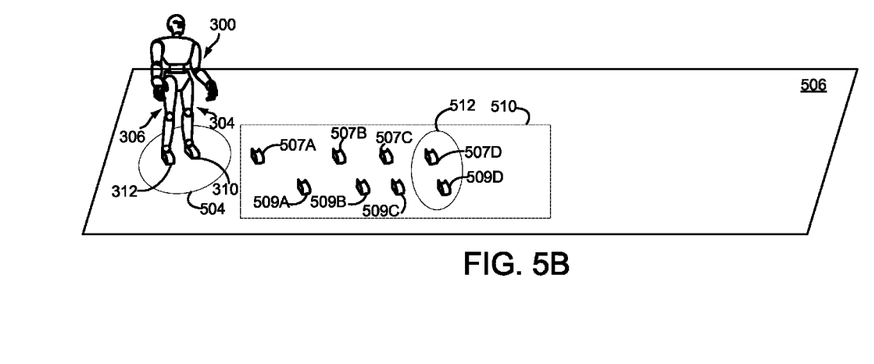
FIG. 5B depicts an example safe trajectory for a robot.

Referring back to FIG. 4, at block 404 the method 400 includes determining one or more second movements of a safe trajectory that begins with the robot at the first position and ends with the robot standing at a second position. Referring to FIG. 5B, for example, the robot 300 may determine one or more second movements of a safe trajectory 510. As shown, the safe trajectory 510 begins at the position 504 on the walking surface 506 and ends at a position 512 on the walking surface 506 (i.e., a position of the robot 300 when the feet 310 and 312 rest respectively at stride positions 507D and 509D).

The safe trajectory 510 may be defined by one or more movements that the robot 300 may execute. For instance, one or more motors of the robot 300 may move the leg 304 so that the foot 310 impacts the walking surface 506 at stride positions 507A, 507B, 507C, and 507D. Similarly, the one or more motors of the robot 300 may move the leg 306 so that the foot 312 impacts the walking surface 506 at stride positions 509A, 509B, 509C, and 509D. More specifically, the one or more motors of the robot 300 may cause the leg 306 to push off from the position 504, allowing the leg 304 to stride and place the foot 310 at the stride position 507A. Next, the one or more motors may cause the leg 304 to push off from the stride position 507A, allowing the leg 306 to stride and place the foot 312 at the stride position 509A. In a similar fashion, the one or motors may sequentially cause the foot 310 to land at the stride position 507B, the foot 312 to land at the stride position 509B, the foot 310 to land at the stride position 507C, the foot 312 to land at the stride position 509C, the foot 310 to land at the stride position 507D, and the foot 312 to land at the stride position 509D. In some examples, the safe trajectory 510 may include other stride positions for placement of the feet 310 and 312.

In some examples, the stride positions 507A-D and 509A-D of the safe trajectory 510 may correspond to shorter stride lengths for the robot 300 than stride lengths corresponding to the stride positions 503A-E and 505A-E of the walking trajectory 502. For example, the walking trajectory 502 may represent the robot 300 moving from the position 504 to the position 508 as quickly as possible, or at least not in a state of deceleration during much of the walking trajectory 502. In contrast, the safe trajectory 510 may represent a trajectory that is optimized for the robot 300 to come to rest at the position 512 in a minimized amount of time and/or distance travelled. The robot 300 may determine the one or more second movements and corresponding stride positions 507A-D and 509A-D of the safe trajectory 510 accordingly.

To this end, the method 400 may further include determining a velocity at which the robot is moving relative to the walking surface, and determining the one or more second movements based on the determined velocity. For example, the robot 300 may use any velocity and/or acceleration sensor described above to determine a velocity at which the robot 300 is moving relative to the walking surface 506 when the robot 300 is at the position 504. If, for example, the robot 300 determines that the robot 300 is moving at a high velocity at position 504, the robot 300 may determine a safe trajectory 510 that includes a large number of decelerating strides that cover a large distance, in order not to decelerate too rapidly and risk the robot 300 falling over. In contrast, if the robot 300 determines that the robot 300 is moving at a low velocity at position 504, the robot 300 may determine a safe trajectory 510 that includes a small number of decelerating strides that cover a smaller distance.

The method 400 may further include determining a characteristic of the walking surface, and determining the one or more second movements based on the determined characteristic of the walking surface. For example, the robot 300 may use any sensors described above (e.g., a camera and/or an accelerometer) to determine what type of terrain makes up various portions of the walking surface 506. The robot 300 may determine the one or more second movements of the safe trajectory 510 such that the safe trajectory 510 avoids icy, wet, unstable, or overly inclined surfaces, for example. Alternatively, the robot 300 may execute the safe trajectory 510 over an icy, wet, unstable, or inclined surface and adjust the safe trajectory 510 to account for these factors.

In the case of an icy, wet, or unstable walking surface 506, the robot 300 may determine a large number of stride locations and/or a large distance of travel for the safe trajectory 510 when compared to what the robot 300 might otherwise determine for a stable walking surface 506. More specifically, the robot 300 may determine the one or more second movements to correspond to short strides so as to keep the legs 304 and 306 near a center of mass of the robot 300.

If the robot 300 determines that the walking surface 506 is inclined upward in a direction corresponding to a possible safe trajectory 510, the robot 300 may determine the safe trajectory 510 to have a decreased number of stride locations and/or a small distance of travel when compared to what the robot 300 might determine for a flat walking surface 506. In contrast, if the robot 300 determines that the walking surface 506 is inclined downward in the direction corresponding to a possible safe trajectory 510, the robot 300 may determine the safe trajectory 510 to have an increased number of stride locations and/or a large distance of travel when compared to what the robot 300 might otherwise determine for a flat walking surface 506, so that the robot may decelerate against gravity in a stable manner.

In some examples, the robot 300 may identify a plurality of trajectories ending respectively at a plurality of positions on the walking surface 506 such that the robot could achieve a standing stationary position at each of the plurality of positions by executing the respective trajectories. In this context, the robot 300 may determine the one or more second movements by selecting the safe trajectory from the plurality of trajectories such that, of any of the plurality of trajectories, the selected safe trajectory requires the least amount of time for the robot 300 to execute.

Figure 6:
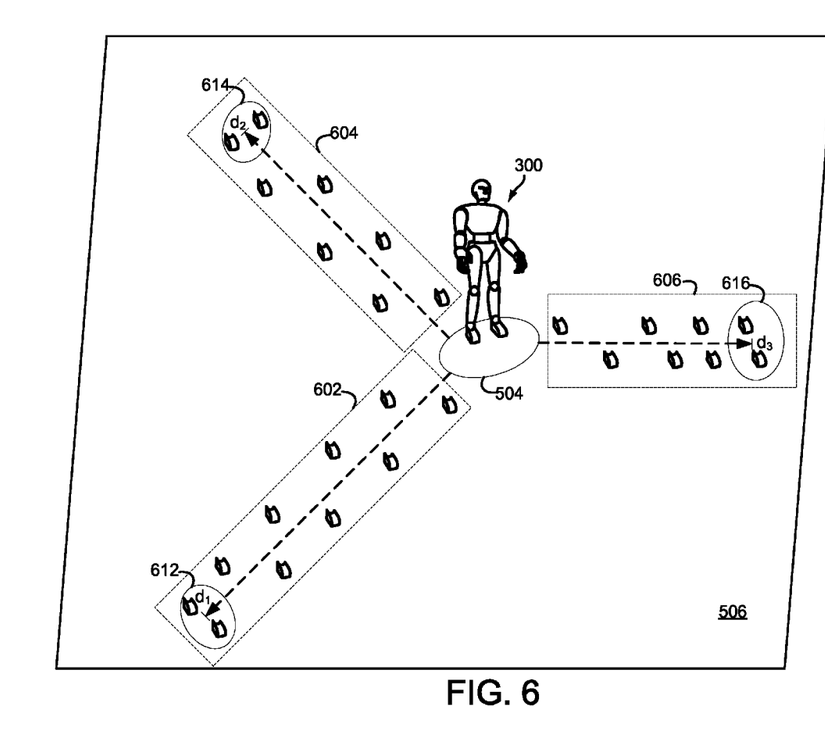
FIG. 6 depicts example safe trajectories for a robot.

Referring to FIG. 6, for example, the robot 300 may identify potential safe trajectories 602, 604, and 606 ending respectively at positions 612, 614, and 616. The robot 300 may determine one or more motor movements and/or stride positions for the safe trajectories 602-606 in any manner described above. For example, the robot 300 may determine that the safe trajectory 602 includes ten strides and covers a distance $d_1$. The robot 300 may also determine that the safe trajectory 604 includes eight strides and covers a distance $d_2$. The robot 300 may also determine that the safe trajectory 606 includes eight strides and covers a distance $d_3$.

The robot 300 may determine that the safe trajectory 604 would take less time to execute than the safe trajectory 602 because the safe trajectory 604 includes fewer stride positions than the safe trajectory 602 and covers a smaller distance than the safe trajectory 602. However, the robot 300 may also determine that the safe trajectory 606 would take less time to execute than the safe trajectory 604 because, even though the safe trajectory 604 and the safe trajectory 606 include an equal number of stride positions, the safe trajectory 606 covers a smaller distance than the safe trajectory 604. The robot 300 may accordingly select the safe trajectory 606 to be executed by the robot 300. The robot 300 may evaluate other information as well in determining how much time the robot 300 would take to respectively execute each of the safe trajectories 602-606.

Referring back to FIG. 4, at block 406 the method includes making a first prediction of whether the one or more motors executing the one or more first movements would cause a future temperature of any of the one or more motors to exceed a threshold temperature. Referring to FIG. 5A for example, the robot 300 may predict whether its one or more motors executing the one or more first movements corresponding to the walking trajectory 502 would cause a future temperature of any of the one or more motors to exceed a threshold temperature.

In some examples, the threshold temperature might be 150° C. That is, experimental data may show that a motor may begin to suffer damage as its temperature reaches 150° C. In other cases, the threshold temperature may be lower than a temperature at which the motor begins to suffer damage. This may represent a safety margin of sorts. In practice, the threshold temperature may take the form of any temperature and may vary based on the type of motor used and/or how cautious or aggressive a user wishes to be with regard to pushing the motor to its performance limits.

To estimate the future temperature of a motor of the one or more motors, the robot 300 may perform some preliminary actions. For example, the robot 300 may (1) determine a current temperature of the motor via a temperature sensor coupled to the motor and (2) determine or calculate an electric input current for the motor that, when provided to the motor, causes the motor to execute a portion of the one or more first movements of the walking trajectory 502 that are associated with that particular motor. The input current may be determined or calculated using inverse dynamics, for example. The robot 300 may estimate the future temperature of the motor based on a heat resistance model of the motor, the current temperature of the motor, and the determined input current corresponding to the walking trajectory 502. The heat resistance model of the motor may represent a function that associates a current temperature of the motor and an input current to be provided to the motor with a future temperature of the motor. Some aspects of block 406 are discussed below in relation to block 410.

Estimation of future motor temperatures may alternatively and/or additionally include the use of a Kalman filter or other prediction algorithms designed to process data representing known correlations between motor temperatures and walking trajectories to estimate or predict future motor temperatures.

At block 408, the method 400 includes making a second prediction of whether the one or more motors executing the one or more second movements would cause a future temperature of any of the one or more motors to exceed the threshold temperature. Referring to FIG. 5B for example, the robot 300 may predict whether its one or more motors executing the one or more second movements corresponding to the safe trajectory 510 would cause a future temperature of any of the one or more motors to exceed a threshold temperature.

With respect to block 408, the robot 300 may estimate the future temperature of a motor using methods similar to that described above with respect to block 406. Also, the estimated future motor temperature may be used to make the second prediction using methods similar to that described above with respect to block 406.

At block 410, the method 400 includes, based on the first prediction and the second prediction, causing the one or more motors to execute either (i) the one or more first movements or (ii) the one or more second movements.

Figure 7:
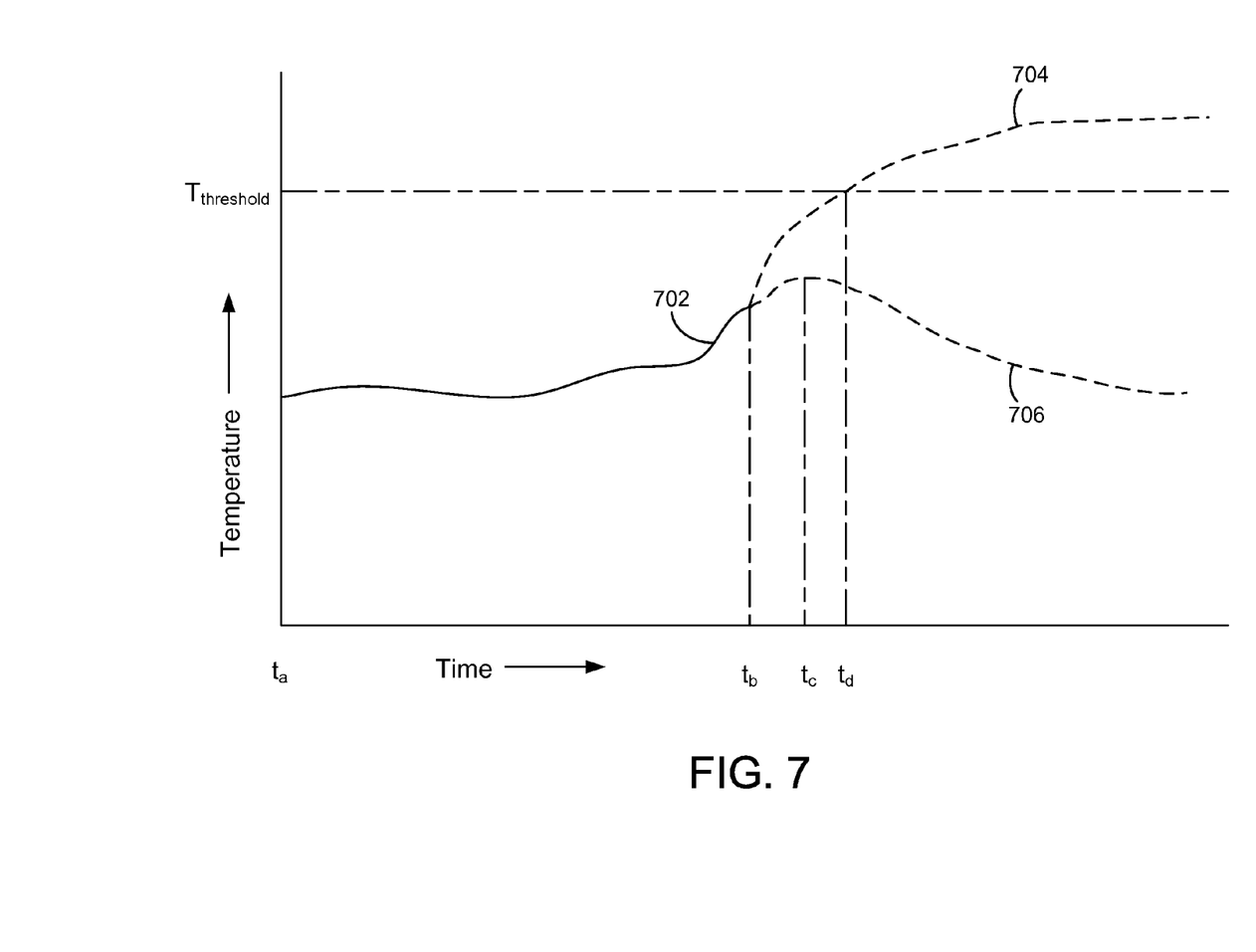
FIG. 7 depicts example temperature curves for a motor of a robot.

Referring to FIG. 7, for example, the curve 702 may represent the actual past temperature of a particular motor of the robot 300 from time "$t_a$" to time "$t_b$," which may correspond to the motor executing a previous trajectory in concert with other motors of the robot 300. The past temperature may be determined via a temperature sensor of the robot 300, for example. The robot 300 may determine the one or more first movements of the walking trajectory 502 and the one or more second movements of the safe trajectory 510 at or near time "$t_b$."

The curve 704 may represent the predicted future temperature of the motor beginning at time "$t_b$" if the motor were provided an input current corresponding to the one or more first movements of the walking trajectory 502. As shown by curve 704, if the motor were to execute the walking trajectory 502, the temperature of the motor may exceed the threshold temperature ($T_{threshold}$) at time "$t_d$," thereby overheating and possibly causing damage to the motor. In this scenario, the robot 300 predicts that the one or more motors executing the one or more first movements of the walking trajectory 502 would cause a future temperature of at least one of the motors to exceed the threshold temperature.

The curve 706 may represent the predicted future temperature of the motor beginning at time "$t_b$" if the motor were provided an input current corresponding to the one or more second movements of the safe trajectory 510. As shown by curve 706, if the motor were to execute the safe trajectory 510, the temperature of the motor may reach a maximum at time "$t_c$," but might not ever exceed the threshold temperature ($T_{threshold}$). The time "$t_c$" may represent a time at which the robot 300 finishes executing the safe trajectory 510 and stands at the position 512. In this scenario, the robot 300 predicts that the one or more motors executing the one or more second movements of the safe trajectory 510 would not cause a future temperature of any of the one of the motors to exceed the threshold temperature.

In this example, because the robot 300 predicted that executing the walking trajectory 502 would cause a future temperature of at least one motor of the one or more motors to exceed the threshold temperature, the robot 300 causes the one or more motors to execute the one or more second movements of the safe trajectory 510.

Figure 8:
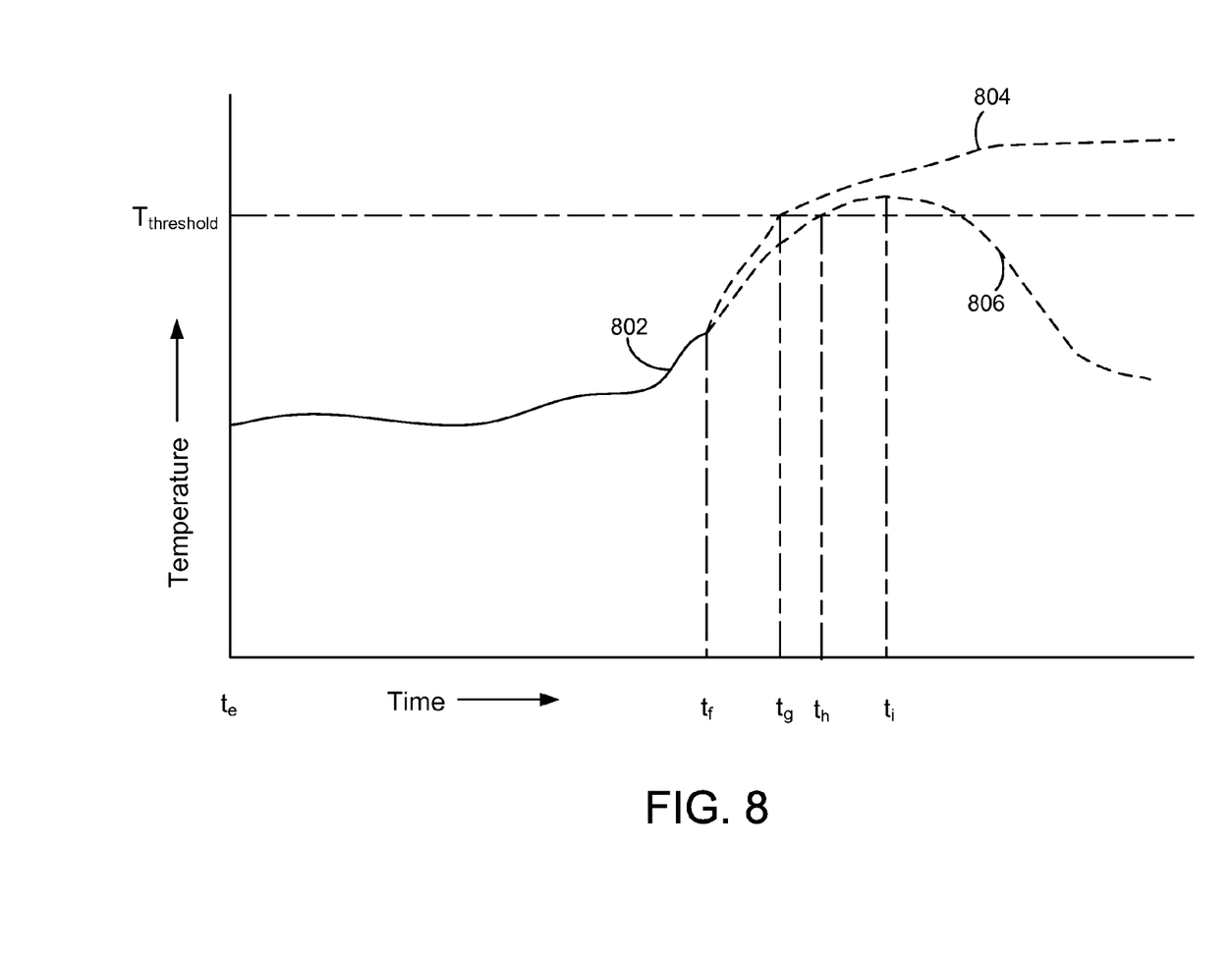
FIG. 8 depicts further example temperature curves for a motor of a robot.

Referring to FIG. 8 as another example, the curve 802 may represent the actual past temperature of a particular motor of the robot 300 from time "$t_e$" to time "$t_f$," which may correspond to the motor executing a previous trajectory in concert with other motors of the robot 300. The past temperature may be determined via a temperature sensor of the robot 300, for example. The robot 300 may determine the one or more first movements of the walking trajectory 502 and the one or more second movements of the safe trajectory 510 at or near time "$t_f$."

The curve 804 may represent the predicted future temperature of the motor beginning at time "$t_f$" if the motor were provided an input current corresponding to the one or more first movements of the walking trajectory 502. As shown by curve 804, if the motor were to execute the walking trajectory 502, the temperature of the motor may exceed the threshold temperature ($T_{threshold}$) at time "$t_g$," thereby overheating and possibly causing damage to the motor. In this scenario, the robot 300 predicts that the one or more motors executing the one or more first movements of the walking trajectory 502 would cause a future temperature of at least one of the motors to exceed the threshold temperature.

The curve 806 may represent the predicted future temperature of the motor beginning at time "$t_f$" if the motor were to be provided an input current corresponding to the one or more second movements of the safe trajectory 510. As shown by curve 806, if the motor were to execute the safe trajectory 510, the temperature of the motor may exceed the threshold temperature ($T_{threshold}$) at time "$t_h$" and reach a maximum at time "$t_i$." In this scenario, the robot 300 predicts that the one or more motors executing the one or more second movements of the safe trajectory 510 would cause a future temperature of at least one of the motors to exceed the threshold temperature. In some examples, the threshold temperature may actually be lower than a motor temperature at which the motor might suffer temporary or permanent damage (e.g., overheat).

In this example, because the robot 300 predicted that both executing the walking trajectory 502 and executing the safe trajectory 510 would cause a future temperature of at least one motor of the one or more motors to exceed the threshold temperature, the robot 300 causes the one or more motors to execute the one or more second movements of the safe trajectory 510. In this scenario, the robot 300 might achieve a standing posture at the position 512 before overheating occurs.

Figure 9:
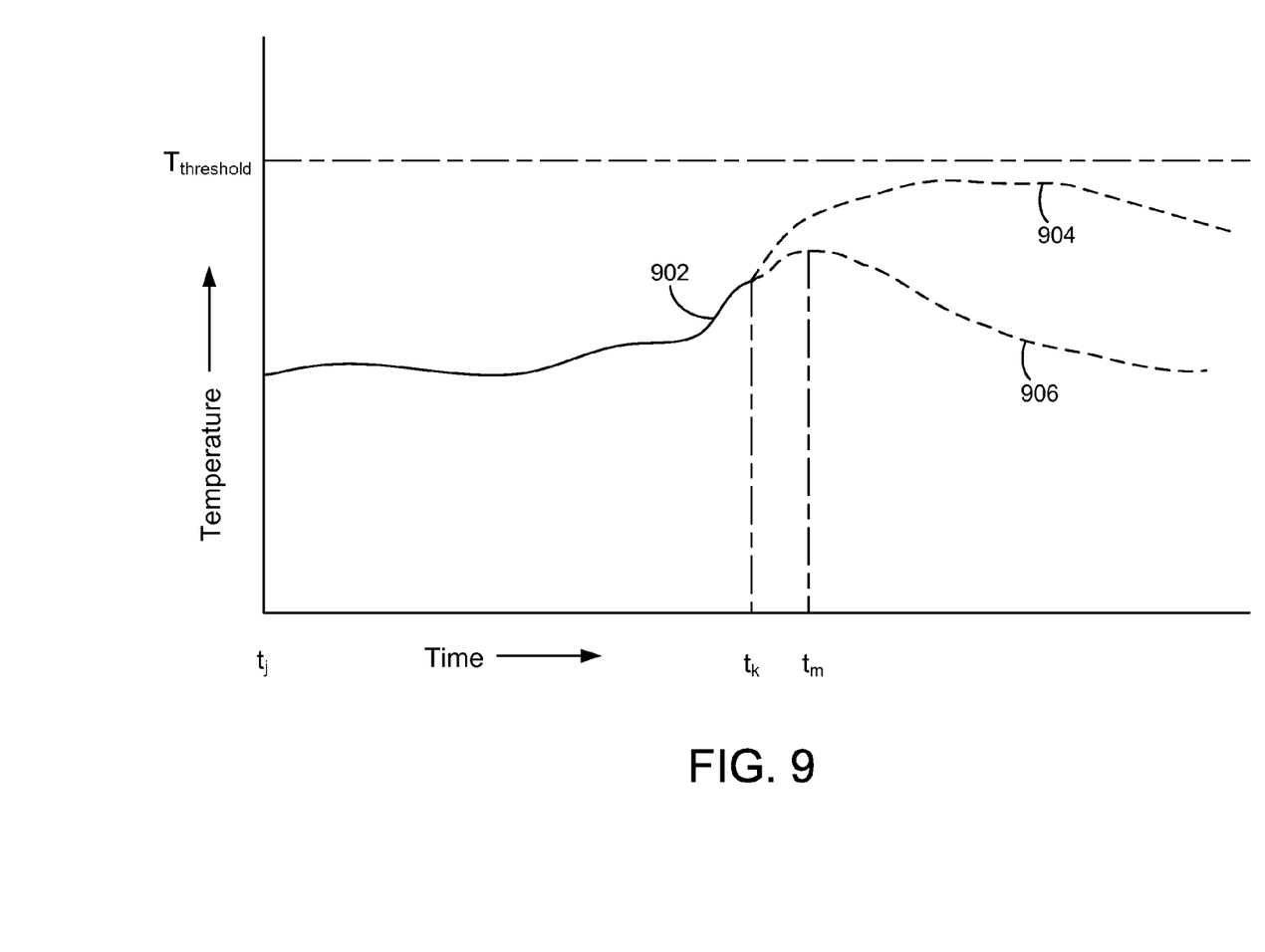
FIG. 9 depicts yet further example temperature curves for a motor of a robot.

Referring to FIG. 9 as another example, the curve 902 may represent the actual past temperature of a particular motor of the robot 300 from time "$t_j$" to time "$t_k$," which may correspond to the motor executing a previous trajectory in concert with other motors of the robot 300. The past temperature may be determined via a temperature sensor of the robot 300, for example. The robot 300 may determine the one or more first movements of the walking trajectory 502 and the one or more second movements of the safe trajectory 510 at or near time "$t_k$."

The curve 904 may represent the predicted future temperature of the motor beginning at time "$t_k$" if the motor were provided an input current corresponding to the one or more first movements of the walking trajectory 502. As shown by curve 904, if the motor were to execute the walking trajectory 502, the temperature of the motor might not exceed the threshold temperature ($T_{threshold}$) at all, in contrast to the examples depicted in FIGS. 7 and 8. In this scenario, the robot 300 predicts that the one or more motors executing the one or more first movements of the walking trajectory 502 would not cause a future temperature of any of the motors to exceed the threshold temperature.

The curve 906 may represent the predicted future temperature of the motor beginning at time "$t_k$" if the motor were provided an input current corresponding to the one or more second movements of the safe trajectory 510. As shown by curve 906, if the motor were to execute the safe trajectory 510, the temperature of the motor may reach a maximum at time "$t_m$," but might not ever exceed the threshold temperature ($T_{threshold}$). In this scenario, the robot 300 predicts that the one or more motors executing the one or more second movements of the safe trajectory 510 would not cause a future temperature of any of the motors to exceed the threshold temperature.

In this example, because the robot 300 predicted that neither executing the walking trajectory 502 nor executing the safe trajectory 510 would cause a future temperature of any motor of the one or more motors to exceed the threshold temperature, the robot 300 causes the one or more motors to execute the one or more first movements of the walking trajectory 502.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code and/or data for longer periods of time, such as secondary or persistent long term storage, like read only memory (ROM), optical or magnetic disks, compact-disc read only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the Figures should not be viewed as limiting. It should be understood that other embodiments can include more or less of each element shown in a given figure. Further, some of the illustrated elements can be combined or omitted. Yet further, an example embodiment can include elements that are not illustrated in the Figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A robot comprising:
one or more processors;
one or more motors; and
a computer-readable storage medium storing instructions that, when executed by the one or more processors, cause the one or more processors to perform functions comprising:
determining one or more first movements of a walking trajectory that begins with the robot at a first position;
determining one or more second movements of a safe trajectory that begins with the robot at the first position and ends with the robot standing at a second position;
making a first prediction of whether the one or more motors executing the one or more first movements would cause a future temperature of any of the one or more motors to exceed a threshold temperature;
making a second prediction of whether the one or more motors executing the one or more second movements would cause a future temperature of any of the one or more motors to exceed the threshold temperature; and
causing the one or more motors to execute the one or more first movements based on predicting that neither executing the one or more first movements nor executing the one or more second movements would cause a future temperature of any of the one or more motors to exceed the threshold temperature.

2. The robot of claim 1, the functions further comprising:
receiving a command for the robot to move to a third position,
wherein determining the one or more first movements comprises determining the one or more first movements such that the one or more motors executing the one or more first movements causes the robot to move to the third position.

3. The robot of claim 1, the functions further comprising:
determining a velocity at which the robot is moving relative to a walking surface,
wherein determining the one or more second movements comprises determining the one or more second movements based on the determined velocity.

4. The robot of claim 1, the functions further comprising:
determining a characteristic of a walking surface,
wherein determining the one or more second movements comprises determining the one or more second movements based on the determined characteristic of the walking surface.

5. The robot of claim 4, wherein determining the characteristic of the walking surface comprises determining a type of terrain of the walking surface.

6. The robot of claim 4, wherein determining the characteristic of the walking surface comprises determining an incline of the walking surface.

7. The robot of claim 1, the functions further comprising:
identifying a plurality of trajectories corresponding respectively to a plurality of positions for the robot to achieve a standing stationary position at each of the plurality of positions by executing the respective trajectories,
wherein determining the one or more second movements comprises selecting the safe trajectory from the plurality of trajectories such that, of the plurality of trajectories, the safe trajectory requires a least amount of time to execute.

8. The robot of claim 1, the functions further comprising:
determining a current temperature of a motor of the one or more motors,
wherein making the first prediction comprises making the first prediction based on the current temperature of the motor.

9. The robot of claim 1, the functions further comprising:
determining an input current for a motor of the one or more motors that, when provided to the motor, causes the motor to execute at least one movement of the one or more first movements,
wherein making the first prediction comprises making the first prediction based on the input current determined for the motor.

10. The robot of claim 1, the functions further comprising:
determining a current temperature of a motor of the one or more motors;
determining an input current for the motor that, when provided to the motor, causes the motor to execute at least one movement of the one or more first movements; and
estimating a future temperature of the motor based on a heat resistance model of the motor, the current temperature of the motor, and the input current determined for the motor,
wherein making the first prediction comprises making the first prediction based on the estimated future temperature of the motor.

11. The robot of claim 1, the functions further comprising:
determining a current temperature of a motor of the one or more motors,
wherein making the second prediction comprises making the second prediction based on the current temperature of the motor.

12. The robot of claim 1, the functions further comprising:
determining an input current for a motor of the one or more motors that, when provided to the motor, cause the motor to execute at least one movement of the one or more second movements,
wherein making the second prediction comprises making the second prediction based on the input current determined for the motor.

13. The robot of claim 1, the functions further comprising:
determining a current temperature of a motor of the one or more motors;
determining an input current for the motor that, when provided to the motor, causes the motor to execute at least one movement of the one or more second movements; and
estimating a future temperature of the motor based on a heat resistance model of the motor, the current temperature of the motor, and the input current determined for the motor,
wherein making the second prediction comprises making the second prediction based on the estimated future temperature of the motor.

14. A non-transitory computer-readable medium storing instructions that, when executed by one or more processors of a robot, cause the one or more processors to perform functions comprising:
determining one or more first movements of a walking trajectory that begins with the robot at a first position;
determining one or more second movements of a safe trajectory that begins with the robot at the first position and ends with the robot standing at a second position;
making a first prediction of whether the one or more motors executing the one or more first movements would cause a future temperature of any of the one or more motors to exceed a threshold temperature;
making a second prediction of whether the one or more motors executing the one or more second movements would cause a future temperature of any of the one or more motors to exceed the threshold temperature; and
causing the one or more motors to execute the one or more second movements based on predicting that executing the one or more second movements would cause a future temperature of at least one of the one or more motors to exceed the threshold temperature.

15. The non-transitory computer-readable medium of claim 14, the functions further comprising:
determining a velocity at which the robot is moving relative to a walking surface,
wherein determining the one or more second movements comprises determining the one or more second movements based on the determined velocity.

16. The non-transitory computer-readable medium of claim 14, the functions further comprising:
determining a characteristic of a walking surface,
wherein determining the one or more second movements comprises determining the one or more second movements based on the determined characteristic of the walking surface.

17. A method comprising:
determining one or more first movements of a walking trajectory that begins with a robot at a first position;
determining one or more second movements of a safe trajectory that begins with the robot at the first position and ends with the robot standing at a second position;
making a first prediction of whether one or more motors of the robot executing the one or more first movements would cause a future temperature of any of the one or more motors to exceed a threshold temperature;
making a second prediction of whether the one or more motors executing the one or more second movements would cause a future temperature of any of the one or more motors to exceed the threshold temperature; and
causing the one or more motors to execute the one or more first movements based on predicting that neither executing the one or more first movements nor executing the one or more second movements would cause a future temperature of any of the one or more motors to exceed the threshold temperature; or
causing the one or more motors to execute the one or more second movements based on predicting that executing the one or more second movements would cause a future temperature of at least one of the one or more motors to exceed the threshold temperature.

18. The non-transitory computer-readable medium of claim 14, the functions further comprising:
receiving a command for the robot to move to a third position,
wherein determining the one or more first movements comprises determining the one or more first movements such that the one or more motors executing the one or more first movements causes the robot to move to the third position.

19. The non-transitory computer-readable medium of claim 14, the functions further comprising:
identifying a plurality of trajectories corresponding respectively to a plurality of positions for the robot to achieve a standing stationary position at each of the plurality of positions by executing the respective trajectories,
wherein determining the one or more second movements comprises selecting the safe trajectory from the plurality of trajectories such that, of the plurality of trajectories, the safe trajectory requires a least amount of time to execute.

20. The method of claim 17, further comprising:
identifying a plurality of trajectories corresponding respectively to a plurality of positions for the robot to achieve a standing stationary position at each of the plurality of positions by executing the respective trajectories,
wherein determining the one or more second movements comprises selecting the safe trajectory from the plurality of trajectories such that, of the plurality of trajectories, the safe trajectory requires a least amount of time to execute.

* * * * *